Oct. 8, 1929.　　　J. F. O'CONNOR　　　1,730,863

ANTIFRICTION BEARING

Filed Jan. 14, 1924

Witnesses
Wm. Geiger

Inventor
John F. O'Connor
By George J. Haight
His Atty

Patented Oct. 8, 1929

1,730,863

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

ANTIFRICTION BEARING

Application filed January 14, 1924. Serial No. 686,007.

This invention relates to improvements in anti-friction bearings.

One object of the invention is to provide a simple and efficient anti-friction bearing, especially adapted for use on railway cars as a side bearing and which has both a plane bearing surface and an anti-friction element associated therewith, and wherein the anti-friction element will take the load and carry it in either direction for a predetermined amount of travel and then move out of operative position so as to permit the plane bearing surface to carry the load for any additional excessive travel, the anti-friction element automatically returning to its normal central position when the load is released.

Figure 1:
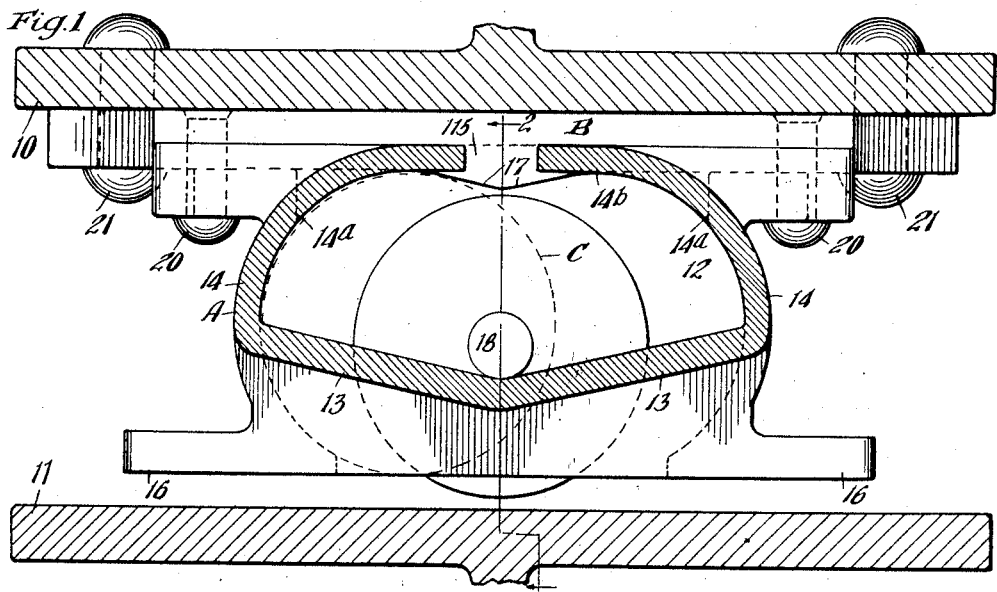
Figure 2:
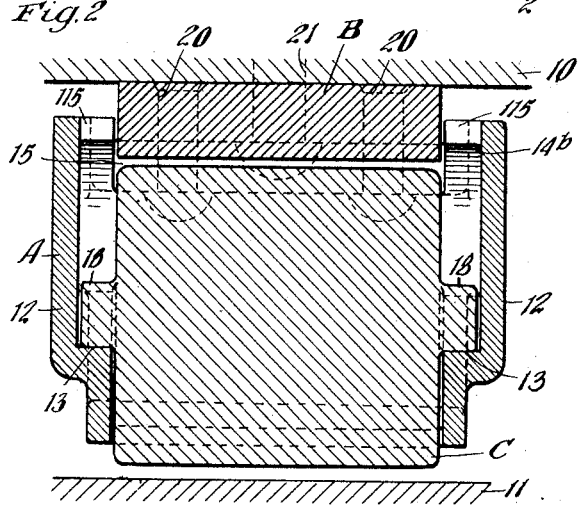

In the drawing forming a part of this specification, Figure 1 is a vertical sectional view taken through the ends of the body and truck bolster of a car, showing my improvements in connection therewith. And Figure 2 is a vertical sectional view taken on the line 2—2 of Figure 1.

In said drawing, 10 denotes the under side of the body bolster and 11 the upper side of the corresponding opposed truck bolster. The improved bearing is shown applied to the body bolster and comprises, broadly, a base casting, housing or retaining member A; a bearing plate B; and an anti-friction element proper, C.

The housing A is of more or less box-like form, having side walls 12, inturned or flanged adjacent their lower ends to form tracks 13. These tracks extend upwardly in opposite directions from their center, as clearly shown in Figure 1. The end walls 14 of the housing are curved and extended upwardly for their full width to points as indicated at 14ª and the end portions only are extended still farther upwardly in the form of arcuate flanges 14ᵇ, as best shown in Figure 2 so as to leave a major opening 15 through which the body of the element C may be inserted, and centrally disposed slots 115 to permit the passage of the lugs 18 therethrough when the element C is assembled with the housing A. The bottom of the housing is open so as to permit the anti-friction element proper to normally project therethrough for cooperation with the truck bolster, in a manner to be hereinafter described, the ends of said housing being extended, as indicated at 16, to provide flat or plane bearing surfaces of extended width and area adapted to slidably engage the upper surface of the truck bolster, in a manner to be hereinafter described.

The anti-friction element proper, C, is in the form of a cylindrical roller having side trunnions 18 adapted to roll on the trackways 13, and be automatically self-centering when the actuating pressure is released. The bearing block B is interposed between the top of the housing and the body bolster and has a bearing surface 17, extending upwardly in both directions from its center. The bearing surface 17 and the track ways 13 are preferably parallel, as shown.

In assembling the parts, the anti-friction element is inserted through the opening 15 of the casting, the trunnions 18 of the anti-friction element passing through the narrow openings 115 and then resting on the trackways 13. The bearing block or plate B is thereafter permanently connected to the top of the housing, as by rivets 20, thus providing a unitary structure for shipping and application. The bearing block is suitably extended at its ends and is, in turn, adapted to be secured to the bolster by other rivets 21.

In operation, assuming that the bolster 11 is moved toward the left relatively to the bolster 10, the anti-friction roller will be engaged and actuated by the bolster 11, rolling upwardly of its inclined bearing surface 17 and constantly and gradually moving upwardly relatively to the flat bearing surface 16 of the retaining member, until the roller reaches its extreme position, indicated in dotted lines, when it is then entirely within or flush with the bearing surface 16, so that said flat face may then take up the load and be slidably engaged by the bolster 11. As soon as the load is released and the bolster separated, the anti-friction roller will return to its normal central position under the influence of gravity, riding down the trackway 13 to the normal position shown in full lines.

Thus it is seen that I have provided a side bearing having both a flat or plane bearing surface for taking care of extreme or excessive travel and an anti-friction element, which takes the load for all normal movements. The construction shown is simple, compact, durable, economical and efficient in operation.

I have herein shown and described what I now consider the preferred manner of carrying out my invention, but the same is merely illustrative and I contemplate all changes and modifications that come within the scope of the claims appended hereto.

I claim:

1. In a side bearing, the combination with a retaining member adapted to be mounted on a bolster and having a flat bearing surface slidably engageable with the cooperating opposed bolster; of an anti-friction element adapted to roll back and forth in said retaining member and normally project beyond said plane bearing surface, said element being movable inwardly relatively of said plane bearing surface under load and lying entirely inwardly thereof at the end of its travel so that said plane bearing surface then takes the load.

2. In a side bearing, the combination with a retaining member adapted to be mounted on a bolster and having a flat bearing surface engageable with the cooperating opposed bolster and having an interior bearing surface inclined in opposite directions from the center; of a self-centering anti-friction element adapted to roll back and forth on said inclined bearing surface and normally project beyond said plane bearing surface; said element, when actuated under load, moving inwardly relatively of said plane bearing to lie entirely within said retaining member at the end of rolling movement so as to permit said plane bearing surface to then take up the load until released.

3. In a side bearing, the combination with a retaining member adapted to be mounted on a bolster and having a roller-engaging bearing surface inclined in opposite directions from the center and also having a flat bearing surface adapted to slidably engage the opposed cooperating bolster; of an anti-friction roller within said member and normally projecting there-beyond so as to be actuated by said last-mentioned bolster to roll on said inclined bearing surface and move inwardly relatively of said plane bearing surface as it rolls to its extreme position, so as to lie entirely inwardly of said flat bearing surface at the end of rolling movement, whereat said flat bearing surface engages said last-mentioned bolster, said roller having trunnions projecting therefrom, and said retaining member having guide flanges for supporting said trunnions, whereby said roller automatically returns to normal position under the influence of gravity when the actuating pressure is released.

4. In a side bearing, the combination with a retaining member adapted to be mounted on a bolster and having a plane bearing face at its outer free end remote from said bolster, said bearing face being adapted for slidable engagement with an opposed bolster; a bearing surface within said retainer having a central portion extending outwardly toward said bearing face, and having side portions inclined in opposite directions from said central portion in a direction away from said bearing face; an anti-friction element disposed in said retainer, said element being capable of free travel along said bearing surface, and being of such proportion that when in central position it projects outwardly beyond said bearing face and provides an anti-friction means engagable with an opposed bolster and said bearing surface, the inclination of said bearing surface being such as to permit movement of said element to either side of central position and project beyond said bearing face to operate as an anti-friction element, said element during approach toward the end of said retainer following said bearing surface and being gradually withdrawn within the same until said element ceases to operate as an anti-friction bearing and permits engagement of said bearing face to permit further travel of said retainer with respect to an opposed bolster.

In witness that I claim the foregoing I have hereunto subscribed my name this 10th day of January 1924.

JOHN F. O'CONNOR.